(12) United States Patent
Akashi et al.

(10) Patent No.: US 7,781,090 B2
(45) Date of Patent: *Aug. 24, 2010

(54) SOLID ELECTROLYTE BATTERY

(75) Inventors: Hiroyuki Akashi, Kanagawa (JP); Goro Shibamoto, Miyagi (JP); Shuji Goto, Miyagi (JP)

(73) Assignee: Sony Corporation, Tokyo (JP)

(*) Notice: Subject to any disclaimer, the term of this patent is extended or adjusted under 35 U.S.C. 154(b) by 1311 days.

This patent is subject to a terminal disclaimer.

(21) Appl. No.: 11/147,049

(22) Filed: Jun. 7, 2005

(65) Prior Publication Data
US 2005/0227142 A1 Oct. 13, 2005

Related U.S. Application Data

(63) Continuation of application No. 10/370,357, filed on Feb. 18, 2003, now Pat. No. 6,921,607, which is a continuation of application No. 09/419,247, filed on Oct. 15, 1999, now Pat. No. 6,537,704.

(30) Foreign Application Priority Data

Oct. 16, 1998 (JP) .............................. P10-295778

(51) Int. Cl.
*H01M 6/10* (2006.01)
*H01M 2/02* (2006.01)
(52) U.S. Cl. ..................... 429/94; 429/164; 429/178
(58) Field of Classification Search ................. 429/164, 429/163, 94, 177, 162, 127, 178
See application file for complete search history.

(56) References Cited

U.S. PATENT DOCUMENTS

| 5,344,724 | A  | * | 9/1994  | Ozaki et al. ................. 429/94 |
| 5,354,629 | A  | * | 10/1994 | Kuroda et al. ............... 429/94 |
| 6,145,280 | A  | * | 11/2000 | Daroux et al. .............. 53/433 |
| 6,277,516 | B1 | * | 8/2001  | Sasaki et al. ............... 429/162 |
| 6,348,282 | B1 | * | 2/2002  | Okochi et al. ............... 429/94 |
| 6,921,607 | B2 | * | 7/2005  | Akashi et al. ............... 429/94 |
| 6,926,993 | B2 | * | 8/2005  | Akashi et al. ............... 429/94 |
| 6,933,073 | B2 | * | 8/2005  | Akashi et al. ............... 429/94 |

FOREIGN PATENT DOCUMENTS

| JP | 11-121035 | 4/1999 |
| JP | 11-162252 | 6/1999 |
| JP | 11-026019 | 12/2006 |

* cited by examiner

*Primary Examiner*—Patrick Ryan
*Assistant Examiner*—Thomas H. Parsons
(74) *Attorney, Agent, or Firm*—Sonnenschein Nath & Rosenthal LLP (57) ABSTRACT

A solid electrolyte battery incorporating a positive electrode with an elongated positive-electrode collector having two sides on which positive-electrode active material layers are formed, a negative electrode with an elongated negative-electrode collector having two sides on which negative-electrode active material layers are formed, and a solid electrolyte layer formed between the positive electrode and the negative electrode such that the positive electrode and the negative electrode are laminated and wound. A ratio A/B of the total film thickness A of the positive-electrode active material layers with respect to the total thickness B of the negative-electrode active material layers satisfies a range from 0.5 to 1.2.

1 Claim, 7 Drawing Sheets

SOLID ELECTROLYTE BATTERY

RELATED APPLICATION DATA

The present application is a continuation of U.S. application Ser. No. 10/370,357, filed Feb. 18, 2003, now U.S. Pat. No. 6,921,607, which is a continuation of U.S. application Ser. No. 09/419,247 filed Oct. 15, 1999, now U.S. Pat. No. 6,537,704, which claims priority to Japanese Application No. JP P10-295778 filed Oct. 16, 1998, all of which are incorporated herein by reference to the extent permitted by law.

BACKGROUND OF THE INVENTION

1. Field of the Invention

The present invention relates to a solid electrolyte battery incorporating a solid electrolyte or a gel electrolyte.

2. Description of the Related Art

In recent years, the performance of electronic apparatuses represented by video cameras and portable telephones has significantly been improved and the sizes of the same have considerably been reduced. Also size reduction and improvement in the performance of secondary batteries serving as power sources for the electronic apparatuses have been required. Hitherto, lead batteries and nickel-cadmium batteries have been employed as the secondary batteries. Moreover, research and development of new nonaqueous-electrolyte secondary batteries have energetically been performed each of which contains lithium or a lithium alloy as an active material of a negative electrode.

The nonaqueous-electrolyte secondary battery containing lithium or the lithium alloy as the active material of the negative electrode exhibits a high energy density. The foregoing nonaqueous-electrolyte secondary battery suffers from a problem in that the performance deteriorates owing to growth of dendrite and undesirable shortening of the lifetime against charge and discharge cycles. A nonaqueous-electrolyte secondary battery contains, as the active material of the negative electrode, a material, such as a substance, which is able to dope/dedope lithium ions. Moreover, the nonaqueous-electrolyte secondary battery contains, as the active material of the positive electrode, a composite lithium oxide, such as lithium-cobalt oxide or lithium-nickel oxide. The nonaqueous-electrolyte secondary battery having the above-mentioned structure is free from deposition and dissolution reactions of lithium when the reactions of the electrodes are performed. Therefore, the nonaqueous-electrolyte secondary battery exhibits excellent lifetime against charge/discharge cycles.

Recently, a so-called solid electrolyte battery has been suggested as the nonaqueous-electrolyte secondary battery which contains a carbon material or graphite to constitute the negative electrode. The solid electrolyte battery contains a solid electrolyte or a gel electrolyte. Among the solid electrolyte batteries, a solid electrolyte battery of a type containing a gel electrolyte obtained by plasticizing a polymer material with nonaqueous electrolyte solution exhibits high ion conductivity at room temperatures. Therefore, the above-mentioned secondary batteries have been expected as promising secondary batteries.

The foregoing solid electrolyte battery is free from apprehension of leakage of solution and a necessity for providing a sealing structure using an outer can which has been required for the conventional structure. Therefore, the battery can be manufactured by encapsulating a winding-type electrode consisting of a positive electrode and a negative electrode with a moistureproof laminated film. Therefore, the solid electrolyte battery permits reduction in the weight and thickness as compared with the conventional structure. As a result, the energy density of the battery can furthermore be improved.

The solid electrolyte battery of the foregoing type suffers from a problem in that the discharge load characteristics is inferior to those of the nonaqueous-electrolyte secondary battery because the ion conductivity of the gel electrolyte is half of the ion conductivity of the nonaquaous electrolyte.

SUMMARY OF THE INVENTION

To overcome the foregoing problems experienced with the conventional techniques, an object of the present invention is to provide a solid electrolyte battery which does not deteriorate discharge load characteristics thereof and which is able to raise the energy density.

To achieve the foregoing object, according to one aspect of the present invention, there is provided a solid electrolyte battery comprising: a wound electrode incorporating a positive electrode incorporating an elongated positive-electrode collector having two sides on which positive-electrode active material layers are formed, a negative electrode incorporating an elongated negative-electrode collector having two sides on which negative-electrode active material layers are formed and a solid electrolyte layer formed between the positive electrode and the negative electrode such that the positive electrode and the negative electrode are laminated and wound, wherein when an assumption is made that the total thickness of a pair of the positive-electrode active material layers formed on the two sides of the collector for the positive electrode is total film thickness A and the total thickness of a pair of the negative-electrode active material layers formed on the two sides of the collector for the negative electrode is total thickness B, the total film thickness A of the positive-electrode active material layers satisfies a range from 60 μm to 150 μm, and ratio A/B of the total film thickness A of the positive-electrode active material layers with respect to the total thickness B of the negative-electrode active material layers satisfies a range from 0.5 to 1.2.

Since the solid electrolyte battery according to the present invention is structured as described above, the energy density of the battery can be raised without deterioration in the discharge load characteristics of the battery when an optimum value of the thickness ratio A/B of the total film thickness A of the negative-electrode active material layers with respect to the total thickness B of the negative-electrode active material layers is obtained.

Other objects, features and advantages of the invention will be evident from the following detailed description of the preferred embodiments described in conjunction with the attached drawings.

DESCRIPTION OF THE PREFERRED EMBODIMENTS

Figure 1:
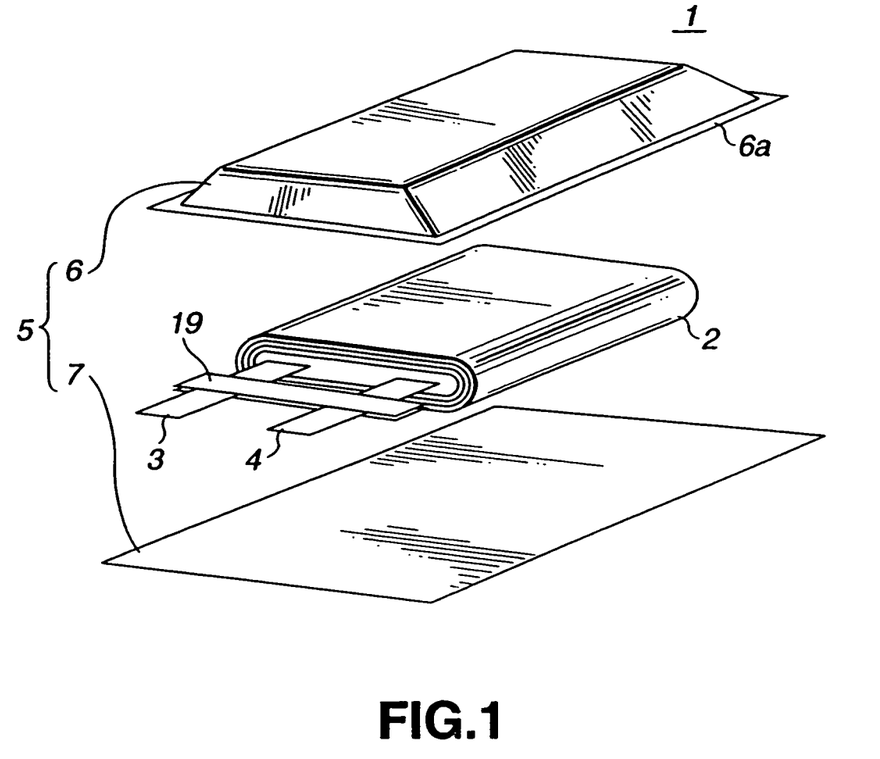
FIG. 1 is an exploded perspective view showing the structure of a polymer lithium-ion secondary battery according to an embodiment of the present invention.
Figure 2:
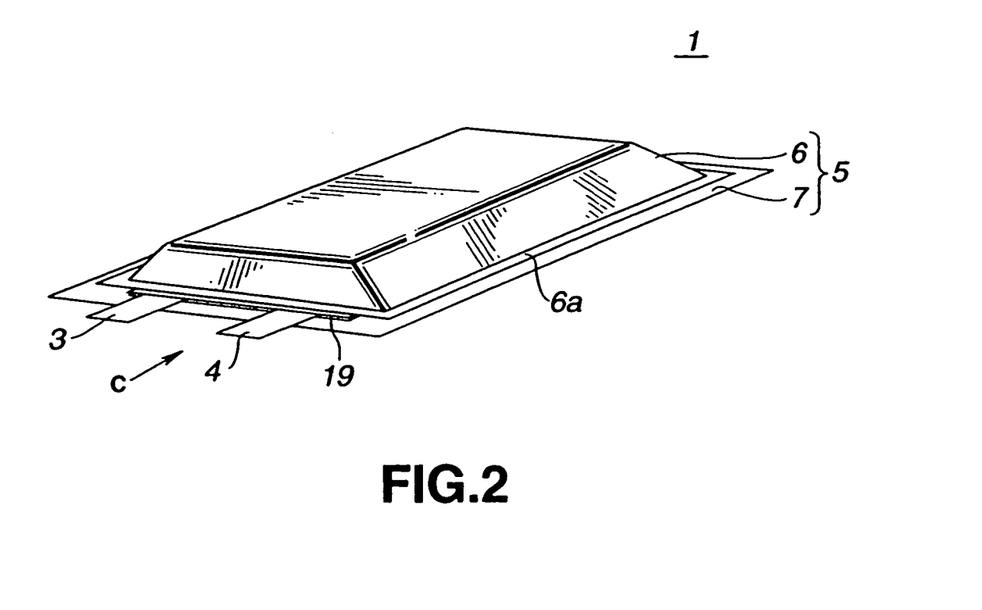
FIG. 2 is a perspective view showing the structure of the polymer lithium ion secondary battery.

An embodiment of the present invention will now be described with reference to the drawings. Referring to FIGS. 1 and 2, the structure of the polymer lithium-ion secondary battery 1 according to the embodiment of the present invention will now be described. A positive-electrode lead wire 3 and a negative-electrode lead wire 4 connected to a wound electrode 2 and serving as external terminals are drawn out to the outside portion. The wound electrode 2 is encapsulated by an upper laminated film 6 and a lower laminated film 7 which constitute a case member 5.

Figure 3:
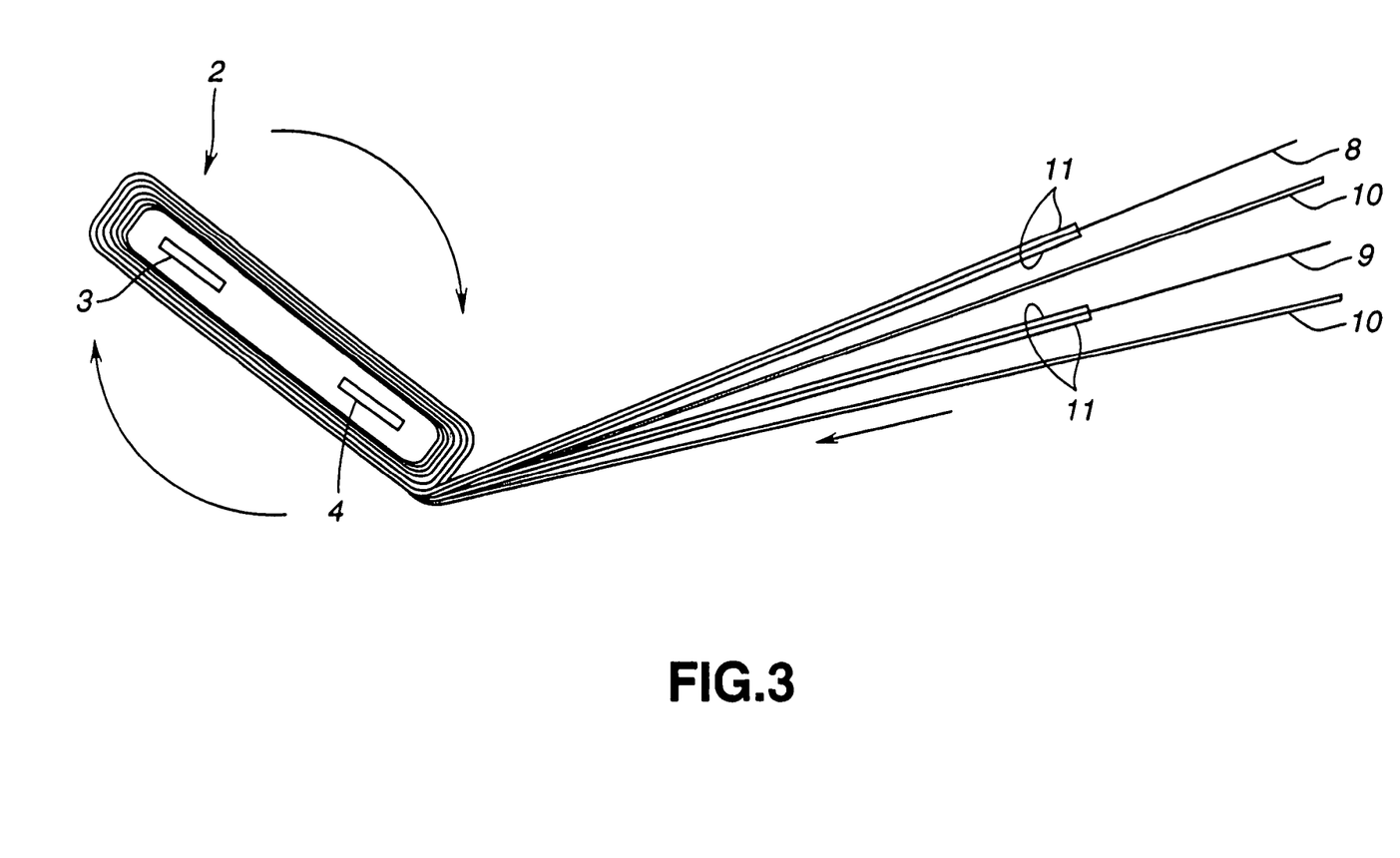
FIG. 3 is a diagram schematically showing the structure of a winding-type electrode of the polymer lithium-ion secondary battery.

As shown in FIG. 3, the wound electrode 2 is structured such that a positive electrode 8 and a negative electrode 9 are laminated and wound through a separator 10. A gel electrolyte layer 11 is formed between the positive electrode 8 and the separator 10 and between the negative electrode 9 and the separator 10.

Figure 4:
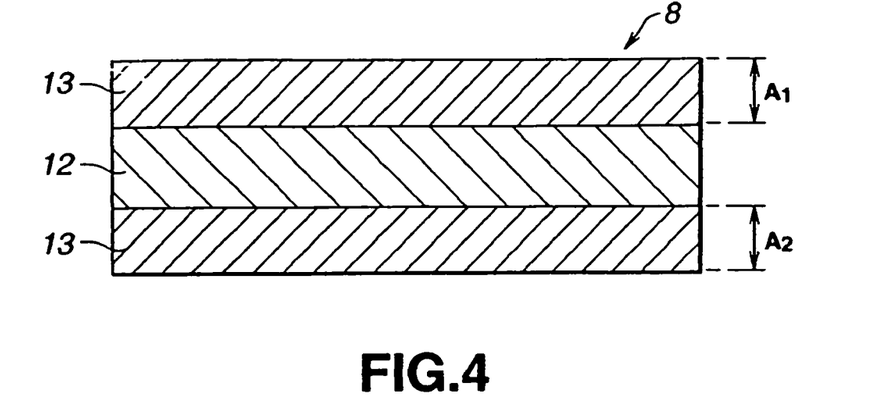
FIG. 4 is a vertical cross sectional view showing the structure of a positive electrode of the polymer lithium-ion secondary battery.

As shown in FIG. 4, the positive electrode 8 is constituted by forming a positive-electrode active material layer 13 on each of the two sides of a positive-electrode collector 12. Moreover, the positive electrode 8 has a gel electrolyte layer 11 formed on each of the positive-electrode active material layers 13 formed on the two sides thereof, as shown in FIG. 5.

Figure 5:
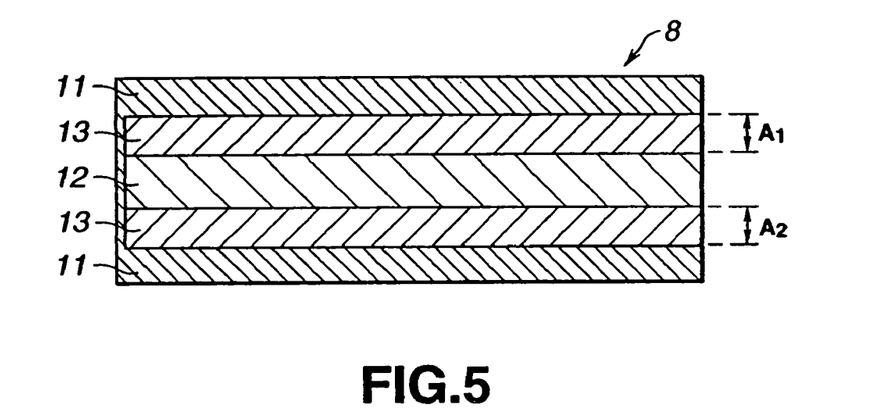
FIG. 5 is a vertical cross sectional view showing a gel electrolyte layer formed on the positive electrode of the polymer lithium-ion secondary battery.

As shown in FIGS. 4 and 5, an assumption about the positive electrode 8 is made that the thicknesses of the positive-electrode active material layers 13 formed on the two sides of the positive-electrode collector 12 are $A_1$ and $A_2$. Another assumption is made that the total thickness of the pair of the positive-electrode active material layers 13 is A Therefore, the total film thickness A of the positive-electrode active material layers 13 can be obtained by calculating $A_1+A_2$.

The positive-electrode collector 12 may be constituted by metal foil, such as aluminum foil, nickel foil or stainless steel foil. It is preferable that the foregoing metal foil is porous metal foil. When the porous metal foil is employed, the adhesive strength between the collector and the electrode layers can be raised. The porous metal foil may be punching metal, expand metal or metal foil having a multiplicity of openings formed by performing an etching process.

The positive-electrode active material for constituting the positive-electrode active material layers 13 may be metal oxide, metal sulfide or a specific polymer material.

The positive-electrode active material may be $Li_xMO_2$ (where M is one or more types of transition metal, preferably Co, Ni or Mn and x which varies depending on the state of charge/discharge of the battery satisfies $0.05 \leq x \leq 1.12$). It is preferable that the transition metal constituting the composite lithium oxide is Co, Ni or Mn. The composite lithium oxide is exemplified by $LiCoO_2$, $LiNiO_2$, $LiNi_yCo_{1-y}O_2$ (where $0<y<1$) and $LiMn_2O_4$.

Two or more types of the positive-electrode active materials may be mixed to constitute the positive-electrode active material layers 13. When the positive-electrode active material layers 13 is formed, a known conducting material and/or a known binder may be added.

Figure 6:
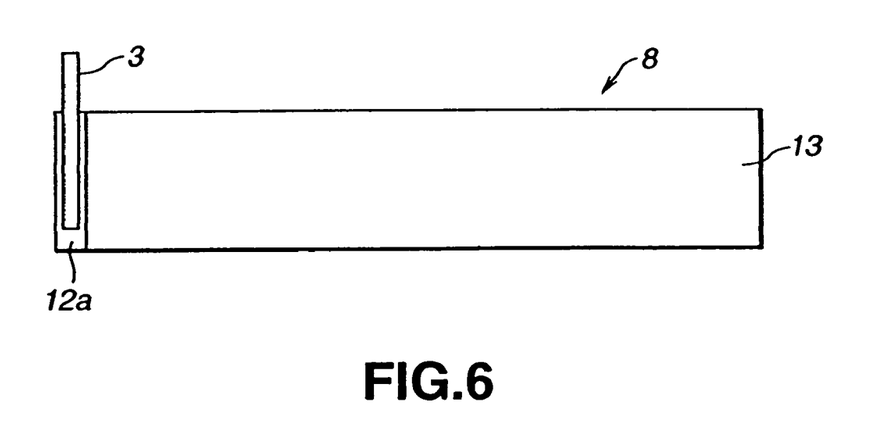
FIG. 6 is a plan view showing the structure of the positive electrode of the polymer lithium-ion secondary battery.

As shown in FIG. 6, the positive electrode 8 has a lengthwise-directional end at which an exposed portion 12a is formed in which the positive-electrode collector 12 is exposed to correspond to the width of the positive-electrode lead wire 3. The positive-electrode lead wire 3 is joined to the exposed portion 12a of the positive-electrode collector 12 such that the positive-electrode lead wire 3 is drawn out from a widthwise-directional end of the exposed portion 12a of the positive-electrode collector 12.

Figure 7:
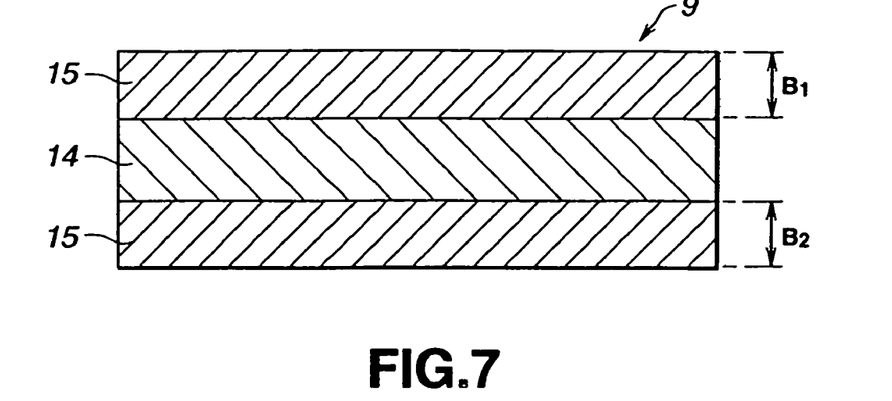
FIG. 7 is a vertical cross sectional view showing the structure of a negative electrode of the polymer lithium-ion secondary battery.
Figure 8:
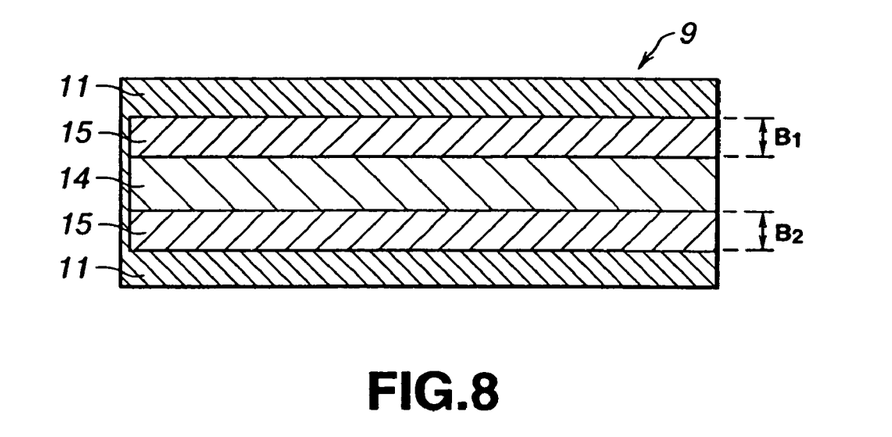
FIG. 8 is a vertical cross sectional view showing a gel electrolyte layer formed on the negative electrode of the polymer lithium-ion secondary battery.

As shown in FIG. 7, the negative electrode 9 has negative-electrode active material layer 15 formed on each of the two sides of the negative-electrode collector 14. As shown in FIG. 8, the negative electrode 9 incorporates the negative-electrode active material layer 15 formed on each of the two sides thereof and having the gel electrolyte layer 11 formed on each of the two sides thereof.

As shown in FIGS. 7 and 8, an assumption about the negative electrode 9 is made that the thicknesses of the negative-electrode active material layers each of which is formed on each of the two sides of the negative-electrode collector are $B_1$ and $B_2$. Another assumption is made that the total thickness of the pair of the negative-electrode active material layers is B. The total film thickness B of the negative-electrode active material layers can be obtained by calculating $B_1+B_2$.

The negative-electrode collector 14 may be constituted by metal foil, such as copper foil, nickel foil or stainless steel foil. It is preferable that the metal foil is porous metal foil. Since the porous metal foil is employed, the adhesive strength between the collector and the electrode layer can be raised. The porous metal foil may be any one of punching metal, expand metal and metal foil having a multiplicity of openings formed by performing an etching process.

It is preferable that the negative-electrode active material for constituting the negative-electrode active material layers 15 is a material which is capable of doping/dedoping lithium. The material capable of doping/dedoping lithium is exemplified by graphite, a non-graphitizable carbon material and a graphitizable carbon material. The carbon material is exemplified by carbon black, such as pyrolysis carbon or acetylene black, graphite, vitreous carbon, active carbon, carbon fiber, a sintered compact of organic polymer, a sintered compact of coffee beans, a sintered compact of cellulose and a sintered compact of bamboo.

Two or more types of the negative-electrode active materials may be mixed to constitute the negative-electrode active material layers 15. When the negative-electrode active material layers 15 is constituted, a known conducting material and/or a known binder may be added.

Figure 9:
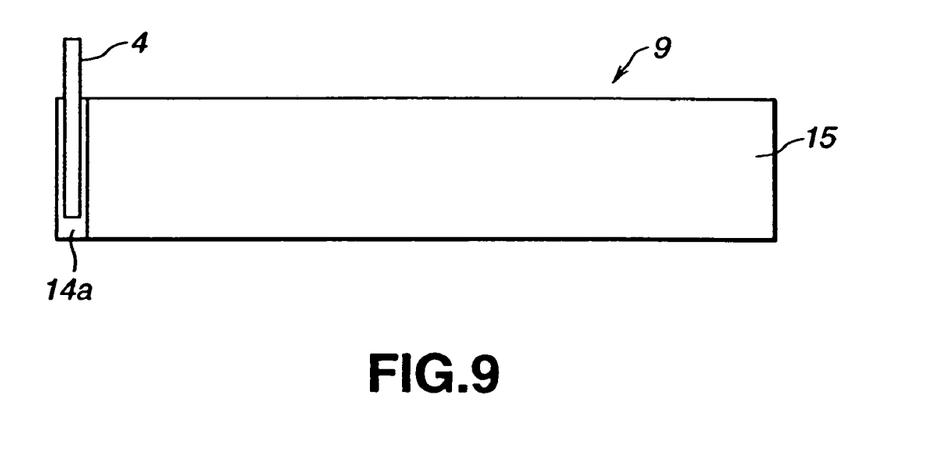
FIG. 9 is a plan view showing the structure of the negative electrode of the polymer lithium-ion secondary battery.

As shown in FIG. 9, the negative electrode 9 has an exposed portion 14a in which the negative-electrode collector 14 is exposed to correspond to the width of the negative-electrode lead wire 4, the exposed portion 14a being formed at a lengthwise-directional end of the negative electrode 9. A negative-electrode lead wire 4 is joined to the exposed portion 14a in which the negative-electrode collector 14 is exposed in such a manner that the negative-electrode lead wire 4 is drawn out from a widthwise-directional end of exposed portion 14a.

It is preferable that the separator 10 is constituted by a thin film having small pores and exemplified by polypropylene, polyethylene or their composite material. It is furthermore preferable that a thin film having small pores is employed which has improved wettability with respect to electrolyte solution by using a surface active agent or by performing a corona discharge process. As a result, rise in the resistance in the battery can be prevented.

When the gel electrolyte layer 11 is formed, a nonaqueous solvent may be employed which is exemplified by ethylene carbonate, polypropylene carbonate, butylene carbonate, γ-butyl lactone, γ-valerolactone, diethoxyethane, tetrahydrofuran, 2-methyl tetrahydrofuran, 1,3-dioxane, methyl acetate, methyl propiolic acid, dimethyl carbonate, diethyl carbonate, ethylmethyl carbonate, 2,4-difluoroanisole, 2,6-difluoroanisole and 4-bromoveratrole. The foregoing material may be employed solely or two or more types of the foregoing materials may be employed as mixed solvent.

When a moistureproof laminated film is employed to constitute the case member 5, the nonaqueous solvent may be composed of a combination of the following materials having a boiling point of 150° C. or higher and exemplified by ethylene carbonate, polypropylene carbonate, γ-butyl lactone, 2,4-difluoroanisole, 2,6-difluoroanisole and 4-bromoveratrole.

When the gel electrolyte layer 11 is formed, an electrolyte salt is employed which is exemplified by lithium salt, such as $LiPF_6$, $LiAsF_6$, $LiBF_4$, $LiClO_4$, $LiCF_3SO_3$, $Li(CF_3SO_2)_2N$ and $LiC_4F_9SO_3$. The foregoing lithium salt may be employed solely or two or more types of the lithium salts may be combined. It is preferable that the quantity of the electrolyte salt which must be added is such that the molar concentration in the nonaqueous electrolyte in the gel electrolyte is 0.10 mol/l to 2.0 mol/l in order to realize a satisfactory ion conductivity.

When the gel electrolyte layer 11 is formed, the polymer material for preparing the gel electrolyte is employed. The polymer material may be polyvinylidene fluoride or copolymer of polyvinylidene fluoride. The copolymer monomer is exemplified by hexafluoropolypropylene and tetrafluoroethylene.

The polymer material for constituting the gel electrolyte may be, for example, polyacrylonitrile or a copolymer of polyacrylonitrile. The copolymer monomer (vinyl monomer) may be any one of the following materials: for example, vinyl acetate, methyl methacrylate, butyl methacrylate, methyl acrylate, butyl acrylate, itaconic acid, methyl acrylate hydride, ethylacrylate hydride, acrylamide, vinyl chloride, vinylidene fluoride and vinylidene chloride. As an alternative to this, any one of the following materials may be employed: acrylonitrile butadiene rubber, acrylonitrile butadiene-styrene resin, acrylonitrile polyethylene-propylene-dienestyrene chloride resin, acrylonitrile vinyl chloride resin, acrylonitrile methaacrylate resin and acrylonitrile acrylate resin.

The polymer material for constituting the gel electrolyte may be polyethylene oxide or a copolymer of polyethylene oxide. The copolymer monomer may be, for example, polypropylene oxide, methylmethacrylate, butyl methacrylate, methyl acrylate or butyl acrylate.

The polymer material for constituting the gel electrolyte may be polyether denatured siloxane or its copolymer.

The polymer material for constituting the gel electrolyte may be employed solely or two or more types of the foregoing materials may be mixed.

To obtain a satisfactory gel electrolyte of the gel electrolyte layer 11, it is preferable that the quantity of the polymer material which must be added is, for example, about 5% to about 50% with respect to the weight of the electrolyte solution. Although the gel electrolyte is employed as the solid electrolyte of the gel electrolyte layer 11, any material having an ion conductivity of 1 mS/cm or greater at room temperatures may be employed as a substitute for the gel solid electrolyte. For example, a solid polymer electrolyte may be employed which is composed of a polymer material obtained by swelling nonaqueous solution which contains the foregoing electrolyte salt. The polymer material for constituting the solid electrolyte may be, for example, polyethylene oxide, polypropylene oxide, polyphosphagen or polysiloxane.

Although the laminated electrolyte 2 has the structure that the separator is disposed between the positive electrode 8 and the negative electrode 9, the present invention is not limited to the foregoing structure. A structure may be employed in which a gel electrolyte layer 10 is formed between the positive electrode 8 and the negative electrode 9 as a substitute for the structure in which the separator is disposed between the positive electrode 8 and the negative electrode 9.

The positive-electrode lead wire 3 and the negative-electrode lead wire 4 may be made of metal, such as aluminum, copper, nickel or stainless steel. Each of the positive-electrode lead wire 3 and the negative-electrode lead wire 4 is formed into a thin plate-like shape or a mesh shape. The positive-electrode lead wire 3 and the negative-electrode lead wire 4 are joined to the corresponding exposed portion 12a of the positive-electrode collector 12 and the exposed portion 14a of the negative electrode 14 of the negative electrode 9 by, for example, resistance welding or supersonic welding.

Figure 10:
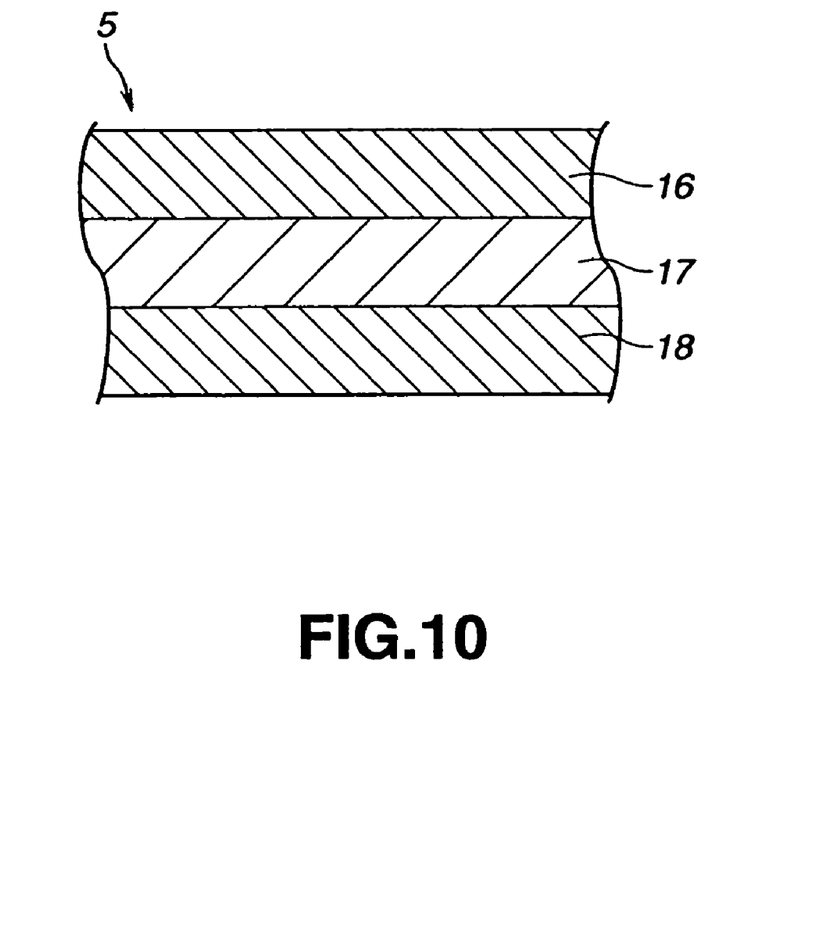
FIG. 10 is a cross sectional view showing an essential portion of the structure of a laminated film of the polymer lithium-ion secondary battery.

As shown in FIG. 10, the case member 5 must have moistureproofing characteristic. For example, the case member 5 has a three-layer structure obtained by bonding the nylon film 16, the aluminum foil 17 and the polyethylene film 18 in this sequential order. As shown in FIGS. 1 and 2, the case member 5 has a projecting structure such that the upper laminated film 6 accommodates the wound electrode 2 and an outer end portion 6a which must be welded is left.

When the wound electrode 2 is encapsulated in the case member 5, the outer end portion 6a of the upper laminated film 6 and the lower laminated film 7 are welded to each other with heat such that the polyethylene film of the upper laminated film 6 and that of the lower laminated film 7 face inside. Then, the internal pressure is reduced and the case member 5 is sealed. At this time, the case member 5 encapsulates the wound electrode 2 such that the positive-electrode lead wire 3 and the negative-electrode lead wire 4 are drawn out from the case member 5.

The structure of the case member 5 is not limited to the foregoing structure. For example, a structure may be employed in which a laminated film formed into a bag shape encapsulates the wound electrode 2. In the foregoing case, the wound electrode 2 is accumulated in the case member 5. Then, the pressure in the case member 5 is reduced and the case member 5 is sealed such that the positive-electrode lead wire 3 and the negative-electrode lead wire 4 are drawn out to the outside portion.

Figure 11:
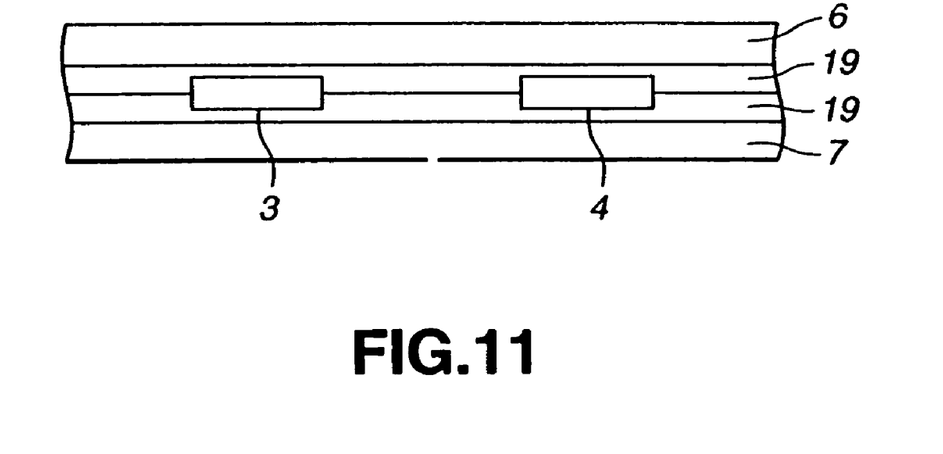
FIG. 11 is a side view viewed from an arrow C shown in FIG. 2 and showing an essential portion.

As shown in FIGS. 1, 2 and 11, when the wound electrode 2 is encapsulated in the case member 5, the upper and lower fusible films 19 made of polyolefine resin are placed on the contact portion among the case member 5, the positive-electrode lead wire 3 and the negative-electrode lead wire 4 to hold the positive-electrode lead wire 3 and the negative-electrode lead wire 4.

The fusible film 19 must have adhesivity with respect to the positive-electrode lead wire 3 and the negative-electrode lead wire 4. For example, polyolefine resin which is the material of the fusible film 19 is exemplified by polyethylene, polypropylene, denatured polyethylene, denatured polypropylene and a copolymer of any one of the foregoing materials. It is preferable that the thickness of the fusible film 19 realized before the fusible film 19 is fused with heat satisfies 20 µm to 200 µm. If the thickness which is realized before the fusible film 19 is fused is smaller than 20 µm, easy handling is not permitted. If the thickness which is realized before the fusible film 19 is fused is larger than 200 µm, water easily penetrates the fusible film 19. In this case, airtightness in the battery cannot easily be maintained.

Therefore, when the wound electrode 2 is encapsulated in the case member 5, the fusible film 19 is welded by performing a heat welding operation. Thus, the adhesiveness among the positive-electrode lead wire 3, the negative-electrode lead wire 4 and the case member 5 can furthermore be improved.

The polymer lithium-ion secondary battery 1 according to the present invention has the above-mentioned structure which is characterized in that the total film thickness A of the positive-electrode active material layers 13 satisfies the range from 60 µm to 150 µm. Moreover, the ratio A/B of the total film thickness A of the positive-electrode active material layers 13 with respect to the total film thickness B of the negative-electrode active material layers 15 satisfies the range from 0.5 to 1.2.

The optimum thickness ratio A/B of the total film thickness A of the positive-electrode active material layers with respect to the total film thickness B of the negative-electrode active material layer is obtained as described above. Therefore, the discharge load characteristic of the battery can be improved. Thus, the energy density of the battery can furthermore be raised.

When the gel electrolyte of the gel electrolyte layer 11 is polyvinylidene fluoride, it is preferable that a gel electrolyte is employed which is composed of multiple polymer obtained by copolymerizing polyhexafluoropolypropylene or polytetrafluoroethylene. As a result, a gel electrolyte having higher mechanical strength can be obtained.

To raise the mechanical strength of the gel electrolyte layer 11, it is preferable that a gel electrolyte is employed which is composed of polymer obtained by copolymerizing hexafluoropolypropylene at a ratio which is lower than 8 wt % with respect to polyvinylidene fluoride. More preferably, a gel electrolyte is employed which is composed of polymer obtained by block-copolymerizing hexafluoropolypropylene at a ratio not less than 3 wt % nor more than 7.5 wt %.

The reason why the ratio of the hexafluoropolypropylene is 7.5 wt % or lower lies in that satisfactory strength cannot be realized when the ratio is higher than the above-mentioned value. The reason why the ratio is 3 wt % or higher lies in that the effect of improving the solvent maintaining performance by copolymerizing hexafluoropolypropylene cannot satisfactorily be obtained. In this case, solvent in a sufficiently large quantity cannot be maintained.

It is preferable that the total thickness A+B of the total film thickness A of the positive-electrode active material layer and the total film thickness B of the negative-electrode active material layer is 500 µm or smaller, more preferably 300 µm or smaller.

EXAMPLES

Examples of the polymer lithium-ion secondary battery according to the present invention will now be described.

Moreover, comparative examples manufactured to be compared with the examples will now be described.

Example 1

In Example 1, the positive electrode was manufactured by initially mixing marketed lithium carbonate and cobalt carbonate such that the composition ratio of lithium atoms and cobalt atoms was 1:1. Then, the mixture was calcinated in air at 900° C. for 5 hours, resulting in obtaining lithium cobalt oxide ($LiCoO_2$) which was employed as the active material of the positive electrode. The lithium cobalt oxide in a quantity of 91 wt %, carbon black serving as a conducting material in a quantity of 6 wt % and polyvinylidene fluoride serving as a binder in a quantity of 3 wt % were mixed so that a mix for constituting the positive electrode was obtained. The mix for the positive electrode is dispersed in N-methylpyrolidone so that slurry (in the form of paste) was obtained. Then, the obtained mix slurry for the positive electrode was uniformly applied to the two sides of aluminum foil which was formed into the collector of the positive electrode and which had a thickness of 20 µm. Then, the two sides of the aluminum foil were dried, and then a roller pressing machine was operated to compression-mold the aluminum foil so that an elongated positive electrode was manufactured.

The thicknesses $A_1$ and $A_2$ of the positive-electrode active material layer formed on each of the two sides of the collector of the positive electrode were substantially the same. The total film thickness A of the pair of the active material of the positive electrode was 60 µm. The density of the positive-electrode active material layer was 3.6 g/cm$^3$.

The negative electrode was manufactured such that graphite in a quantity of 90 wt % and polyvinylidene fluoride serving as the binder in a quantity of 10 wt % were mixed so that a mix for the negative electrode was obtained. The mix for the negative electrode was dispersed in N-methylpyrolidone so that slurry (in the form of paste) was obtained. Then, the obtained mix slurry for the negative electrode was uniformly applied to the two sides of copper foil which was formed into the collector of the negative electrode and which had a thickness of 15 µm. Then, the two sides of the copper foil were dried, and then a roller pressing machine was operated to compression-mold the copper foil so that an elongated negative electrode was manufactured.

The thicknesses $B_1$ and $B_2$ of the negative-electrode active material layer formed on each of the two sides of the collector of the negative electrode were substantially the same. The total film thickness B of the pair of the active material of the negative electrode was 50 µm. The density of the negative-electrode active material layer was 1.6 g/cm$^3$.

Therefore, the thickness ratio A/B of the total film thickness A of the positive-electrode active material layer with respect to the total film thickness B of the negative-electrode active material layer was 1.20.

The negative-electrode lead wire made of mesh-shape copper was spot-welded to the negative electrode, while a positive-electrode lead wire made of mesh-shape aluminum was spot-welded to the positive electrode. The negative and positive electrode lead wires served as terminals for producing external outputs.

The gel electrode layer was formed by using a polymer material obtained by block-copolymerizing polyvinylidene fluoride and hexafluoropolypropylene at a weight ratio of 93:7. Initially, 2,4-difluoroanisole in a quantity of 1 wt % was added to solution obtained by mixing dimethylcarbonate in a quantity of 80 parts by weight, γ-butyllactone in quantity of 42 parts by weight, ethylene carbonate in a quantity of 50 parts by weight propylene carbonate in a quantity of 8 parts by weight and LiPF$_6$ in a quantity of 18 parts by weight. Then, copolymer of polyvinylidene fluoride and hexafluoropolypropylene in a quantity of 10 wt % was added to the foregoing solution so as to uniformly dispersed by a homogenizer. Then, the solution was heated and stirred at 75° C. After the mixed solution was changed to a colorless and transparent state, stirring was interrupted. Then, the solution was uniformly applied to the two sides of each of the positive electrode and the negative electrode by using a doctor blade. Then, the structure was placed in a drying furnace set to 70° C. for three minutes so that a gel electrolyte layer having a thickness of about 25 µm was formed on the surface of each of the positive electrode and the negative electrode.

While thus-manufactured negative electrode and the positive electrode were being laminated, the negative electrode and the positive electrode were wound many times. Thus, a wound electrode was manufactured. The obtained wound electrode was encapsulated into a laminated film under reduced pressure while the lead wire of the negative electrode and the lead wire of the positive electrode were being drawn out to the outside portion. As a result, a polymer lithium-ion secondary battery was manufactured.

Examples 2 to 4

Polymer lithium-ion secondary batteries according to Examples 2 to 4 were manufactured similarly to Example 1 except for the total film thickness A of the positive-electrode active material layer which was identically 60 µm and the total film thicknesses B of the negative-electrode active material layer which were as shown in Table 1. In Examples 2 to 4, the thickness ratios A/B of the total film thickness A of the positive-electrode active material layer with respect to the total film thickness B of the negative-electrode active material layer were made to be 1.00, 0.80 and 0.60 by changing the total film thickness B of the negative-electrode active material layer.

Examples 5 to 8

Polymer lithium-ion secondary batteries according to Examples 5 to 8 were manufactured similarly to Example 1 except for the total film thickness A of the positive-electrode active material layer which was identically 90 µm and the total film thicknesses B of the negative-electrode active material layer which were as shown in Table 1. In Examples 5 to 8, the thickness ratios A/B of the total film thickness A of the positive-electrode active material layer with respect to the total film thickness B of the negative-electrode active material layer were made to be 1.00, 0.80 and 0.60 by changing the total film thickness B of the negative-electrode active material layer.

Examples 9 to 12

Polymer lithium-ion secondary batteries according to Examples 9 to 12 were manufactured similarly to Example 1 except for the total film thickness A of the positive-electrode active material layer which was identically 120 µM and the total film thicknesses B of the negative-electrode active material layer which were as shown in Table 1. In Examples 9 to 12, the thickness ratios A/B of the total film thickness A of the positive-electrode active material layer with respect to the total film thickness B of the negative-electrode active material layer were made to be 1.00, 0.80 and 0.60 by changing the total film thickness B of the negative-electrode active material layer.

Examples 13 to 16

Polymer lithium-ion secondary batteries according to Examples 13 to 16 were manufactured similarly to Example 1 except for the total film thickness A of the positive-electrode active material layer which was identically 150 µm and the total film thicknesses B of the negative-electrode active material layer which were as shown in Table 1. In Examples 13 to 16, the thickness ratios A/B of the total film thickness A of the positive-electrode active material layer with respect to the total film thickness B of the negative-electrode active material layer were made to be 1.00, 0.80 and 0.60 by changing the total film thickness B of the negative-electrode active material layer.

Comparative Examples 1 to 3

Polymer lithium-ion secondary batteries according to Comparative Examples 1 to 3 were manufactured similarly to Example 1 except for the total film thickness A of the positive-electrode active material layer which was identically 60 µm and the total film thicknesses B of the negative-electrode active material layer which were as shown in Table 1. In Comparative Examples 1 to 3, the thickness ratios A/B of the total film thickness A of the positive-electrode active material layer with respect to the total film thickness B of the negative-electrode active material layer were made to be 1.40, 0.40 and 0.20 by changing the total film thickness B of the negative-electrode active material layer.

Comparative Examples 4 to 6

Polymer lithium-ion secondary batteries according to Comparative Examples 4 to 6 were manufactured similarly to Example 1 except for the total film thickness A of the positive-electrode active material layer which was identically 90 µm and the total film thicknesses B of the negative-electrode active material layer which were as shown in Table 1. In Comparative Examples 4 to 6, the thickness ratios A/B of the total film thickness A of the positive-electrode active material layer with respect to the total film thickness B of the negative-electrode active material layer were made to be 1.40, 0.40 and 0.20 by changing the total film thickness B of the negative-electrode active material layer.

Comparative Examples 7 to 9

Polymer lithium-ion secondary batteries according to Comparative Examples 7 to 9 were manufactured similarly to Example 1 except for the total film thickness A of the positive-electrode active material layer which was identically 120 µm and the total film thicknesses B of the negative-electrode active material layer which were as shown in Table 1. In Comparative Examples 7 to 9, the thickness ratios A/B of the total film thickness A of the positive-electrode active material layer with respect to the total film thickness B of the negative-electrode active material layer were made to be 1.40, 0.40 and 0.20 by changing the total film thickness B of the negative-electrode active material layer.

Comparative Examples 10 to 12

Polymer lithium-ion secondary batteries according to Comparative Examples 10 to 12 were manufactured similarly to Example 1 except for the total film thickness A of the positive-electrode active material layer which was identically 150 µm and the total film thicknesses B of the negative-electrode active material layer which were as shown in Table 1. In Comparative Examples 10 to 12, the thickness ratios A/B of the total film thickness A of the positive-electrode active material layer with respect to the total film thickness B of the negative-electrode active material layer were made to be 1.40, 0.40 and 0.20 by chancing the total film thickness B of the negative-electrode active material layer.

Comparative Examples 13 to 19

Polymer lithium-ion secondary batteries according to Comparative Examples 13 to 19 were manufactured similarly to Example 1 except for the total film thickness A of the positive-electrode active material layer which was identically 180 μm and the total film thicknesses B of the negative-electrode active material layer which were as shown in Table 1. In Comparative Examples 13 to 19, the thickness ratios A/B of the total film thickness A of the positive-electrode active material layer with respect to the total film thickness B of the negative-electrode active material layer were made to be 1.40, 1.20, 1.00, 0.80, 0.60, 0.40 and 0.20 by changing the total film thickness B of the negative-electrode active material layer.

TABLE 1

| | Total Film Thickness A of Positive Electrode (μm) | Total Film Thickness B of Negative Electrode (μm) | Film Thickness Ratio A/B | Capacity Ratio (%) | Energy Density (Wh/l) |
|---|---|---|---|---|---|
| Example 1 | 60 | 50 | 1.20 | 93 | 205 |
| Example 2 | 60 | 60 | 1.00 | 92 | 230 |
| Example 3 | 60 | 75 | 0.80 | 91 | 223 |
| Example 4 | 60 | 100 | 0.60 | 94 | 217 |
| Example 5 | 90 | 75 | 1.20 | 84 | 215 |
| Example 6 | 90 | 90 | 1.00 | 83 | 242 |
| Example 7 | 90 | 113 | 0.80 | 82 | 234 |
| Example 8 | 90 | 150 | 0.60 | 85 | 228 |
| Example 9 | 120 | 100 | 1.20 | 75 | 226 |
| Example 10 | 120 | 120 | 1.00 | 75 | 254 |
| Example 11 | 120 | 150 | 0.80 | 74 | 246 |
| Example 12 | 120 | 200 | 0.60 | 76 | 239 |
| Example 13 | 150 | 125 | 1.20 | 68 | 223 |
| Example 14 | 150 | 150 | 1.00 | 67 | 250 |
| Example 15 | 150 | 188 | 0.80 | 66 | 242 |
| Example 16 | 150 | 250 | 0.60 | 69 | 236 |
| Comparative Example 1 | 60 | 43 | 1.40 | 92 | 192 |
| Comparative Example 2 | 60 | 150 | 0.40 | 92 | 206 |
| Comparative Example 3 | 60 | 300 | 0.20 | 90 | 198 |
| Comparative Example 4 | 90 | 64 | 1.40 | 83 | 202 |
| Comparative Example 5 | 90 | 225 | 0.40 | 83 | 216 |
| Comparative Example 6 | 90 | 450 | 0.20 | 81 | 208 |
| Comparative Example 7 | 120 | 86 | 1.40 | 75 | 212 |
| Comparative Example 8 | 120 | 300 | 0.40 | 75 | 227 |
| Comparative Example 9 | 120 | 600 | 0.20 | 73 | 218 |
| Comparative Example 10 | 150 | 107 | 1.40 | 67 | 209 |
| Comparative Example 11 | 150 | 375 | 0.40 | 67 | 224 |
| Comparative Example 12 | 150 | 750 | 0.20 | 66 | 215 |
| Comparative Example 13 | 180 | 129 | 1.40 | 54 | 202 |
| Comparative Example 14 | 180 | 150 | 1.20 | 54 | 216 |
| Comparative Example 15 | 180 | 180 | 1.00 | 54 | 242 |
| Comparative Example 16 | 180 | 225 | 0.80 | 53 | 235 |
| Comparative Example 17 | 180 | 300 | 0.60 | 55 | 229 |
| Comparative Example 18 | 180 | 450 | 0.40 | 54 | 217 |
| Comparative Example 19 | 180 | 900 | 0.20 | 52 | 209 |

Experiments for Evaluating Characteristics

The thus-manufactured polymer lithium-ion secondary batteries according to Examples 1 to 16 and Comparative Examples 1 to 19 were subjected to charging and discharging operation experiments by using a potentiogalvanostat by a constant-current and constant-voltage method. Then, discharge capacities required to obtain capacity ratios and energy densities were measured. The measurement was performed by the following method.

Initially, charging was started with an electric current of 200 mA. When the voltage of a closed circuit was raised to 4.2 V, the charging method was changed to constant-voltage. After 8 hours were elapsed from the start of the experiment, the charging operation was completed. Then, discharge was performed under the constant-current condition of 200 mA. When the voltage of the closed circuit was raised to 3.0 V, the discharging operation was completed. The foregoing charging/discharging cycles was performed three times. The discharge capacity obtained after the third discharging operation was performed was measured.

Then, charging was started with a current value of 500 mA. When the voltage of the closed circuit was raised to 4.2 V, the charging method was changed to the constant-voltage charging method. The charging operation was completed three hours after the start of the experiment. Then, discharge was performed under the constant-current condition of 3000 mA. When the voltage of the closed circuit was raised to 3.0 V, the discharging operation was completed.

The capacity ratio was evaluated by obtaining the discharge capacity realized at the third cycle and the discharge capacity at the fourth cycle by using the following equation:

$$CapacityRatio = \frac{\text{discharge capacity at fourth cycle}}{\text{discharge capacity at third cycle}} \times 100$$

The energy density was evaluated by obtaining the same in accordance with the discharge capacity at the third cycle, the average discharge voltage and the volume of the battery.

Results of the evaluations were shown in Table 1.

Figure 12:
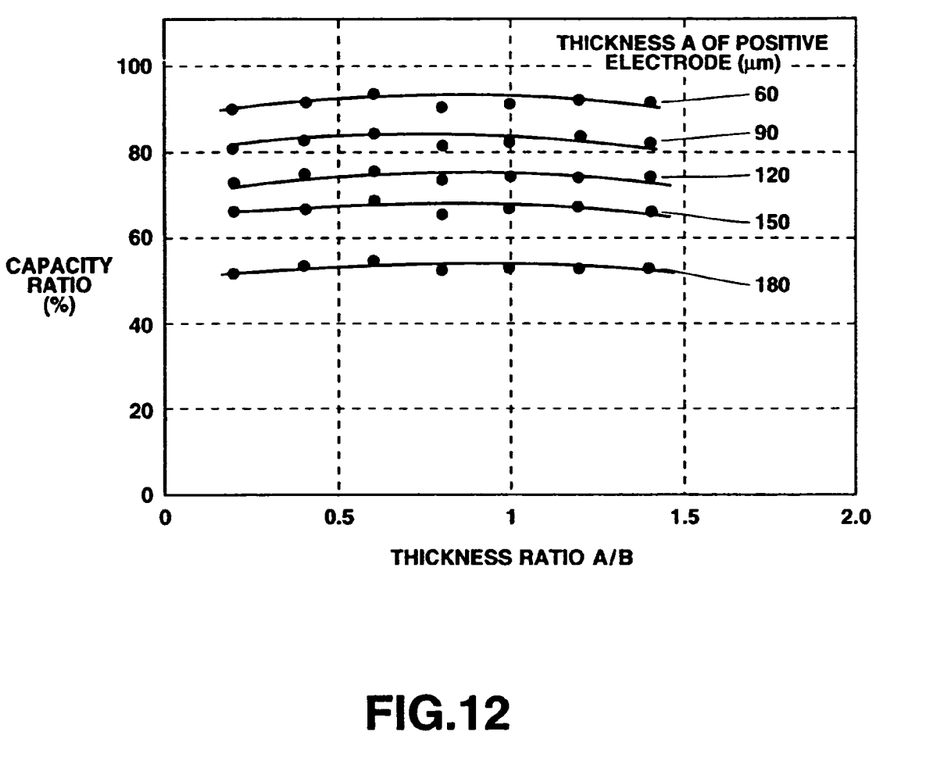
FIG. 12 is a graph showing the relationship between thickness ratios and capacity ratios.

In accordance with the obtained results of the evaluations, the relationship between the thickness ratios and the capacity ratios realized when the total film thickness A of the positive-electrode active material layer was 60 μm, 90 μm, 120 μm and 180 μm as shown in FIG. 12 were obtained so that the evaluation was performed. Similarly, the relationships between the thickness ratios and energy densities as shown in FIG. 13 were obtained so that the evaluation was performed.

As can be understood from FIG. 12, when the cases where the total film thicknesses A of the positive-electrode active material layer were 60 μm, 90 μm, 120 μm and 180 μm were indicated with five curves, the capacity ratio of each battery was 65% or higher when the total film thickness A of the positive-electrode active material layer was 150 μm or smaller. When the total film thickness A of the positive-electrode active material layer was 60 μm, the capacity ratio of each battery was 90% or higher. Therefore, excellent load characteristics were confirmed.

When the total film thickness A of the positive-electrode active material layer was 180 μm, the capacity ratio of the battery was about 50%. Therefore, a fact was confirmed that a satisfactory capacity ratio was not obtained as compared with the other batteries.

Figure 13:
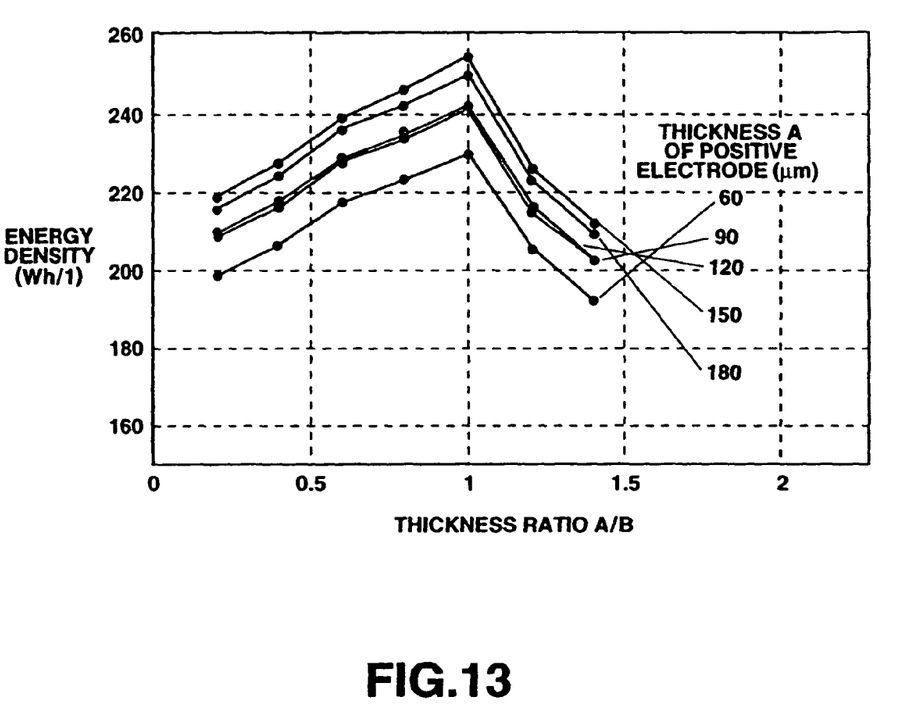
FIG. 13 is a graph showing the relationship between thickness ratios and energy densities.

As can be understood from FIG. 13, when the cases where the total film thickness A of the positive-electrode active material layer was 60 μm, 90 μm, 120 μm, 150 μm and 180 μm were indicated with five curved lines, a fact was confirmed that the energy density was improved as the total film thickness A of the positive-electrode active material layer was enlarged. When the total film thickness A of the positive-electrode active material layer was 180 μm, the energy density was undesirably lowered as compared with the case in which the total film thickness A of the positive-electrode active material layer was 150 μm. When the total film thickness A of the positive-electrode active material layer was 60 μm, the energy density was 200 Wh/1 or lower depending on the thickness ratio A/B. In the foregoing case, the characteristics required for the battery from the market cannot be satisfied (Comparative Example 1 in which the thickness ratio A/B was 1.40 and Comparative Example 3 in which the thickness ratio A/B was 0.20).

As the thickness ratio A/B was raised, the energy density was raised in any case. When the thickness ratio A/B was about 1.00, the energy density was maximized. If the thickness ratio A/B was furthermore raised, the energy density was lowered.

Thus, it is preferable that the total film thickness A of the positive-electrode active material layer satisfies the range from 60 μm to 150 μm. It is preferable that the thickness ratio A/B of the total film thickness A of the positive-electrode active material layer with respect to the total film thickness B of the negative-electrode active material layer satisfies the range from 0.5 to 1.2.

As described above, the present invention is structured such that the optimum values of the total film thickness A of the positive-electrode active material layers of the solid electrolyte battery incorporating the gel electrolyte and the thickness ratio A/B of the total film thickness A of the positive-electrode active material with respect to the total film thickness B of the negative-electrode active material layer are obtained. Thus, according to the present invention, a solid electrolyte battery can be provided which is able to raise the energy density thereof without deterioration in the discharge load characteristics of the battery.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A solid electrolyte battery, comprising:
   (a) an elongated positive electrode comprising an elongated positive-electrode collector having two sides on which positive-electrode active material layers are formed;
   (b) a positive-electrode lead formed into substantially a rectangular shape having a long side and a short side connected to the positive electrode such that the long side of the positive-electrode lead is substantially in parallel with the widthwise direction of the positive electrode;
   (c) an elongated negative electrode comprising an elongated negative-electrode collector having two sides on which negative-electrode active materials layers are formed;
   (d) a negative-electrode lead formed into substantially a rectangular shape having a long side and a short side connected to the negative electrode such that the long side of the negative-electrode lead is substantially in parallel with the widthwise direction of the negative electrode; and
   (e) a solid electrolyte layer formed on at least either surface of the positive electrode and the negative electrode,
   wherein,
      the elongated positive electrode having lengthwise and widthwise directions and a lengthwise end,
      the elongated negative electrode has lengthwise and widthwise directions disposed opposite to the positive electrode,
      the elongated positive electrode and the elongated negative electrode are laminated such that the surfaces in each of which the electrolyte layer is formed are disposed opposite to each other and wound in the lengthwise direction so as to be accommodated in a case of the solid-electrolyte battery,
      when the total thickness of a pair of the positive-electrode active material layers formed on the two sides of the collector for the positive electrode is total film thickness A and the total thickness of a pair of the negative-electrode active material layers formed on the two sides of the collector for the negative electrode is total thickness B, the total film thickness A of the positive-electrode active material layers satisfies a range from 60 μm to 150 μm, and ratio A/B of the total film thickness A of the positive-electrode active material layers with respect to the total thickness B of the negative-electrode active material layers satisfies a range 0.5 to 1.0,
      the short side of at least either of the positive-electrode lead or the negative-electrode lead which is connected to the positive electrode or the negative electrode such that the short side is disposed opposite to the lengthwise end of the positive electrode or the negative electrode is shifted inwards as compared with the lengthwise end of the positive electrode or the negative electrode, and
      the wound electrode is encapsulated by a laminated film, and a lead of the positive electrode and a lead of the negative electrode connected to the wound electrode are drawn out to the outside portion of the laminated film.

* * * * *